United States Patent [19]
Shaw et al.

[11] Patent Number: 5,495,924
[45] Date of Patent: Mar. 5, 1996

[54] HALF-ORDER CENTRIFUGAL PENDULUM VIBRATION ABSORBER SYSTEM

[75] Inventors: Steven W. Shaw, Williamston; Cheng-Tang Lee, Lansing, both of Mich.

[73] Assignee: Quiescence Engineering Corp., Williamston, Mich.

[21] Appl. No.: 274,326

[22] Filed: Jul. 13, 1994

[51] Int. Cl.$^6$ .................................................. F16F 7/10
[52] U.S. Cl. ............................ 188/378; 416/145; 464/180
[58] Field of Search ...................... 74/574; 188/378–380; 416/144, 145; 464/180; 180/902; 381/71

[56] References Cited

U.S. PATENT DOCUMENTS

| | | | |
|---|---|---|---|
| B567,158 | 3/1976 | Eastman et al. | 416/145 |
| 1,855,570 | 4/1932 | Edison | 188/378 X |
| 2,137,591 | 11/1938 | Sarazin | 188/378 |
| 2,306,959 | 12/1942 | Knibbe | 416/145 X |
| 3,372,758 | 3/1968 | Jenney | 416/103 |
| 3,540,809 | 11/1970 | Paul et al. | 416/1 |
| 3,874,818 | 4/1975 | Saunders et al. | 416/144 |
| 3,932,060 | 1/1976 | Vincent et al. | 416/145 |
| 4,057,363 | 11/1977 | Kenigsberg et al. | 416/145 |
| 4,083,654 | 4/1978 | Kenigsberg et al. | 416/145 |
| 4,218,187 | 8/1980 | Madden | 416/145 |
| 4,239,455 | 12/1980 | Broekhuizen et al. | 416/145 |
| 4,550,812 | 11/1985 | Mard | 416/145 X |
| 4,739,679 | 4/1988 | Berger et al. | 74/574 |
| 5,044,333 | 9/1991 | Fuchigami et al. | |
| 5,213,184 | 5/1993 | Legouis et al. | 188/378 |
| 5,291,975 | 5/1994 | Johnson et al. | 267/136 X |

OTHER PUBLICATIONS

"Tautochronic Bifilar Pendulum Torsion Absorbers For Reciprocating Engines", H. H. Denman (Appendix B), *Journal of Sound and Vibration*, vol. 159, 1992, pp. 251–277.

SAE Technical Paper Series No. 911876 entitled "Reducing Vibration of Reciprocating Engines with Crankshaft Pendulum Vibration Absorbers", presented at International Off–Highway & Powerplant Congress and Exposition, Sep. 9–12, 1991, V. J. Borowski, H. H. Denman, D. L. Cronin, S. W. Shaw, J. P. Hanisko, L. T. Brooks, D. A. Mikulec and W. B. Crum, and M. P. Anderson.

*Primary Examiner*—Robert J. Oberleitner
*Assistant Examiner*—Alfred Muratori
*Attorney, Agent, or Firm*—Beaman & Beaman

[57] ABSTRACT

A dynamic vibration absorber for a rotating machinery element preferably of the bifilar pendulum vibration absorber type wherein the absorber system includes one or more pair(s) of masses having identical paths of movement relative to the axis of the rotating element whose vibrations are being absorbed, the individual absorber masses of a given pair moving out-of-phase with respect to one another relative to the rotating element wherein a disturbance torque with a frequency that is a multiple of the rotation rate of the rotating element is absorbed by a one-half relative frequency motion of the corresponding half-order absorber pair. The half-order absorber pairs are driven primarily by centrifugal forces, move with a frequency one-half that of the disturbance torque and use non-linear Coriolis forces as the source of the counteracting torque.

5 Claims, 2 Drawing Sheets

HALF-ORDER CENTRIFUGAL PENDULUM VIBRATION ABSORBER SYSTEM

BACKGROUND OF THE INVENTION

1. Field of the Invention

The invention pertains to vibration absorbers of the bifilar centrifugal pendulum vibration absorbing type wherein the centers of mass of the absorber masses are restricted to move along prescribed paths relative to the rotating machine element whose oscillatory torques are to be absorbed.

2. Description of the Related Art

The invention pertains to a general class of vibration absorbers known as centrifugal pendulum vibration absorbers (CPVA) wherein centers of mass of the absorber masses, called pendulums, are restricted to move along prescribed paths relative to the rotating machine component whose vibrations are to be absorbed. Such masses, when properly designed, move in such a manner so as to remove torsional oscillations in the rotating machinery element by counteracting the applied torques which cause torsional oscillations. Such devices are used to dampen vibrations of internal combustion engine crankshafts, and helicopter rotors, and are typified by U.S. Pat. No. 3,372,758; 3,540,809; 3,874, 818; 3,932,060; 4,057,363; 4,083,654; 4,218,187; 4,739,679 and 5,044,333.

In CPVA devices of the type previously developed, and as shown in the above mentioned patents, each pendulum or mass is tuned to counteract a torque component which is at a particular order of the rotation speed of the rotating element. For example, in an in-line four cylinder, four cycle automobile engine, the inertia of the pistons and the connecting rods and in-cylinder gas pressures produce dominant oscillatory torques which pulse with a frequency that is twice the engine's nominal rotational speed, which is a second order torque. Similarly, in a helicopter rotor application for a rotor having N number of blades, the rotor receives N torque pulses per rotation, for example as the rotor passes over the aircraft fuselage, and one order of the torque disturbance is therefore N. In order to use a CPVA to counteract an order N torque component, the CPVA is tuned so that its frequency of small amplitude oscillation is N Q, wherein Q is the nominal rate of rotation of the rotating element in radians per second. In this manner, the motion of the pendulums of the CPVA counteract the torque pulses. However, existing CPVA designs have several significant shortcomings.

First, with known CPVAs the actual frequency of oscillation of the CPVA generally shifts as the amplitude of pendulum oscillation increases, and this leads to serious problems and deficiencies of vibration absorption for certain ranges of torque amplitude and rotational speed. Modifications have been made to CPVA devices for modifying the absorber path to help this mistuning problems, such as shown in U.S. Pat. No. 4,218,187, however, such existing approaches to the problem have not completely overcome these deficiencies. Also, another correction tactic often employed is to intentionally mistune the absorber so that it comes into tune at some desired amplitude, but this procedure causes the absorber to be mistuned at all other amplitudes.

Secondly, even when frequency shifts are endeavored to be overcome by modifications of pendulum movement, such conventional approaches to the problem cause the CPVA to generate higher harmonics in the torque, especially in the 2N component, which reduces its effectiveness, and such approaches, while reducing the Nth harmonic amplitude by as much as 92% may only reduce the overall or net disturbance torque amplitude by 60%.

To our knowledge, no previous CPVA construction has been capable of the elimination of 100% of a torque harmonic over a wide range of operating conditions without inducing higher order harmonics.

OBJECTS OF THE INVENTION

It is an object of the invention to provide a bifilar centrifugal pendulum vibration absorber utilizing one or more pairs of vibration absorbing pendulums which are tuned so that the frequency of small oscillation is NQ/2 producing half-order absorber pairs capable of total elimination of a torque harmonic in a rotating element wherein N is the number of torque pulses per rotation and Q is the nominal rate of rotation.

Another object of the invention is to provide a centrifugal pendulum vibration absorber wherein the absorber constitutes one or more pairs of pendulums tuned so that the frequency of small oscillation is NQ/2 producing a half-order absorber pair wherein the absorber masses move out-of-phase with respect to one another such that the order N/2 components of the torques individually generated by the two absorber masses exactly cancel out, but their order N torque components add directly to give the desired result.

SUMMARY OF THE INVENTION

In the practice of the invention, the apparatus utilizing the concepts, in initial appearance, is very similar to centrifugal pendulum vibration absorbers (CPVA) of the type used to dampen and absorb vibrations in internal combustion engine crankshafts, and in helicopter rotors. Such apparatus may include pendulum masses attached to the rotating element by means of a pair of roller pins rolling along concave surfaces defined on the rotating element and the pendulum mass. As the oscillatory torques existing within the rotating element are transferred to the pendulum masses through the concave surfaces and the roller pins, the relative movement between the pendulum masses and the rotating element produce the desired vibration absorption.

In accord with the invention, one or more pairs of absorber masses are mounted upon the rotating machinery element having identical paths of movements. The absorbers of each pair are identical in mass, and the paths of movement are identical, but it is not necessary that the absorber pendulums be disposed in direct opposition with respect to each other and the axis of the rotating element whose vibrations are being absorbed. The unique characteristics of the invention wherein each absorber pair constitutes a half-order absorber pair results from the dimensional relationships of the distance between the center of rotation of the rotating machinery element, the center of movement of the pendulum masses, the diameter of the roller pins and the radial distance between the center of the roller pins and the center of gravity of the pendulum mass, as well as the configuration of the concave surfaces engaged by the roller pins.

The configuration of a CPVA in accord with the inventive concepts causes each absorber pair to respond at a frequency that is one-half that of the applied torque, i.e. with twice the period, and the absorber masses of each pair move out-of-phase with respect to one another rotating in opposite directions relative to the rotating frame of reference.

The concept of the invention relies on the non-linear aspects of the response, as the desired motion of the system corresponds to a subharmonic response of order two in which the two absorbers of a pair, riding on circular or epicycloidal paths or similar paths tuned to order N/2, move out-of-phase with respect to one another. Epicycloidal paths are preferred as they provide a constant period of oscillation independent of amplitude. In the basic concept of the invention, for an order N torque disturbance, the absorbers are assumed to have a constant period of oscillation independent of amplitude, but of order N/2, regardless of whether N is even or odd. The order N/2 harmonic torque components provided by the individual masses of the absorber pairs exactly cancel with each other, but their order N harmonic components, generated through quadratic terms, add so as to exactly balance the order N harmonic applied torque thus eliminating the torsional oscillations of the rotating inertia. This subharmonic solution exists up to a torque amplitude at which the absorber paths become singular, thus providing a maximum range of operation.

In practice, the above theory to provide half-order absorbers is achieved by using centrifugal pendulum vibration absorber designs similar to those already in existence, wherein pendulum masses are supported upon rotating members by cylindrical roller pins rolling upon concave circular or epicycloidal surfaces defined upon the rotating member and the pendulum masses. The above concepts and desired half-order tuning are achieved by locating the concave surfaces within the rotating member and the pendulum masses upon which the roller engages to the center of the rotating member, and using a roller diameter such that the ratio of the distance between the center of the rotating member and the center of the base circle about which the pendulum moves, for small amplitudes, as divided by the distance between the center of gravity of the pendulum and the center of pendulum movement equals $(N/2)^2$. Accordingly, such half-order tuning can be readily achieved by dimensioning the openings within the rotating member and the pendulum and the diameter of the rollers to achieve the desired half-order tuning.

In the concept of the invention, each absorber mass responds at a frequency that is one-half that of the applied torque, i.e. twice the period, and the absorber masses move out of phase with respect to each other, actually rotating in opposite directions relative to the frame of reference which rotates with the machine component. The resulting torque produced by each absorber mass contains several components including those of frequency NQ/2 and NQ. When added together, the NQ/2 components and all others but one, in fact, cancel completely, while the NQ components add, resulting in the net absorber torque of frequency NQ. This net torque is a pure harmonic and exactly cancels the applied torque, resulting in zero residual torque.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
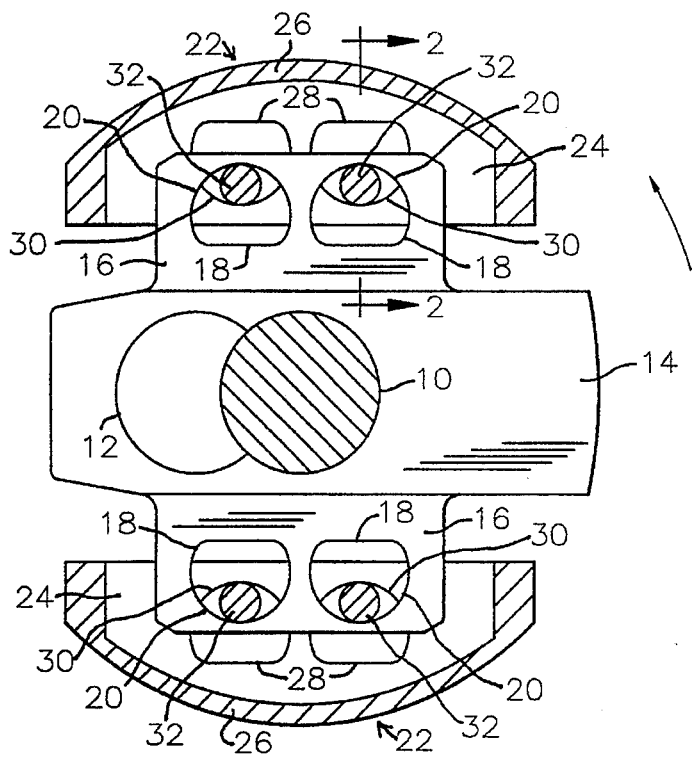
FIG. 1 is a sectional, somewhat schematic, view of an internal combustion engine crankshaft utilizing a bifilar pendulum vibration absorber pair in accord with the inventive concept.

The basic concept of the invention wherein the half-order vibration absorber system is used with a bifilar pendulum system may be used with a variety of embodiments of bifilar pendulum vibration absorbers, and in the following description, three different types of versions of the vibration absorber in accord with the invention are shown in the drawings and described.

In FIG. 1, a typical half-order centrifugal pendulum vibration absorber in accord with the invention using "exterior" pendulum masses is illustrated in a simplified semi-schematic manner as used with the crankshaft of an internal combustion engine normally rotating counterclockwise as indicated by the arrows. In FIG. 1, a crankshaft main bearing is illustrated at 10 in the form of a circle, the center of the bearing 10 constituting the axis of rotation of the crankshaft. Offset from the axis of the main bearing 10 is a connecting rod bearing 12, and the crankshaft will include the usual counterweights 14.

In order to utilize the inventive concepts, the crankshaft includes radially extending flanges 16 which extend from the crankshaft material forming and adjacent to the counterweight 14. The flanges 16 are in diametrically opposed relationship to each other, and each flange 16 includes a pair of identical holes 18. In FIG. 1, the holes 18 are illustrated of a "D" configuration, but these holes may constitute circles, ellipses, or other configurations. The significant portion of the holes 18 is the outer configuration of the holes as represented at 20, such hole portions 20 being of a concave configuration constituting a portion of a circle or an epicycloid. Preferably, the holes' arcuate portions 20 are of an epicycloid configuration as they provide the absorber with a constant period of oscillation independent of amplitude, similar to that described in U.S. Pat. No. 4,218,187.

Figure 2:
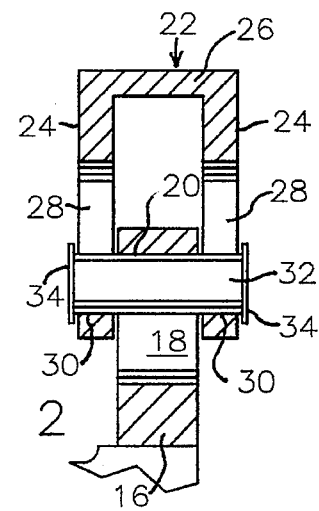
FIG. 2 is an enlarged sectional view of the apparatus of FIG. 1 as taken along Section 2—2 thereof.

The vibrations are absorbed by pendulum masses 22, two being shown in the embodiment of FIG. 1, and the pendulums 22 are of the configuration which will be appreciated from FIGS. 1 and 2, each pendulum including spaced parallel walls 24 interconnected by a base 26 having an outer convex configuration which is substantially circular having a center at the center of the crankshaft main bearing 10.

The pendulum walls 24 are each provided with a pair of aligned holes 28, preferably of a configuration identical to the flange holes 18. The pendulum holes 28 each include an inner concave surface 30 which is identical in configuration to the flange surfaces 20, and is preferably of an epicycloid configuration.

The pendulums 22 are each mounted upon a flange 16 by a pair of cylindrical rollers 32, a roller being mounted within aligned pendulum holes 28 and a flange hole 18, as will be appreciated from FIG. 2. The ends of the rollers 32 are each provided with a retainer 34 of a larger diameter than the main roller body to prevent axial displacement of the rollers 32 when assembled to the flanges and pendulums as shown in the drawing.

As the crankshaft rotates, centrifugal force acting upon the pendulums 22 will force the pendulums radially outward causing the roller 32 to engage the concave surfaces 20 of the flange holes 18, and also cause the rollers 32 to engage the concave surfaces 30 of the pendulum holes 28. Accordingly, it will be appreciated that the rollers 32 maintain the pendulums 22 upon the crankshaft in a manner which permits the pendulums to be angularly displaced about the crankshaft axis of rotation due to the rolling movement of the rollers 32 against the hole surfaces 20 and 30. The path of movement of the pendulums 22 is determined by the configuration of the surfaces 20 and 30, and the pendulums will oscillate in an arc as determined by the shape of the surfaces 20 and 30.

Vibration absorbing or damping is achieved by the absorption of torques by the pendulums 22 which permit angular displacement of the pendulums relative to the axis of the crankshaft. By controlling the radial distance between the crankshaft axis of rotation and the center of pendulum movement by positioning the surfaces 20 and 30, and utilizing a pre-determined radius for rollers 32, the desired half-order absorber pair concept of the invention is achieved.

Figure 3:
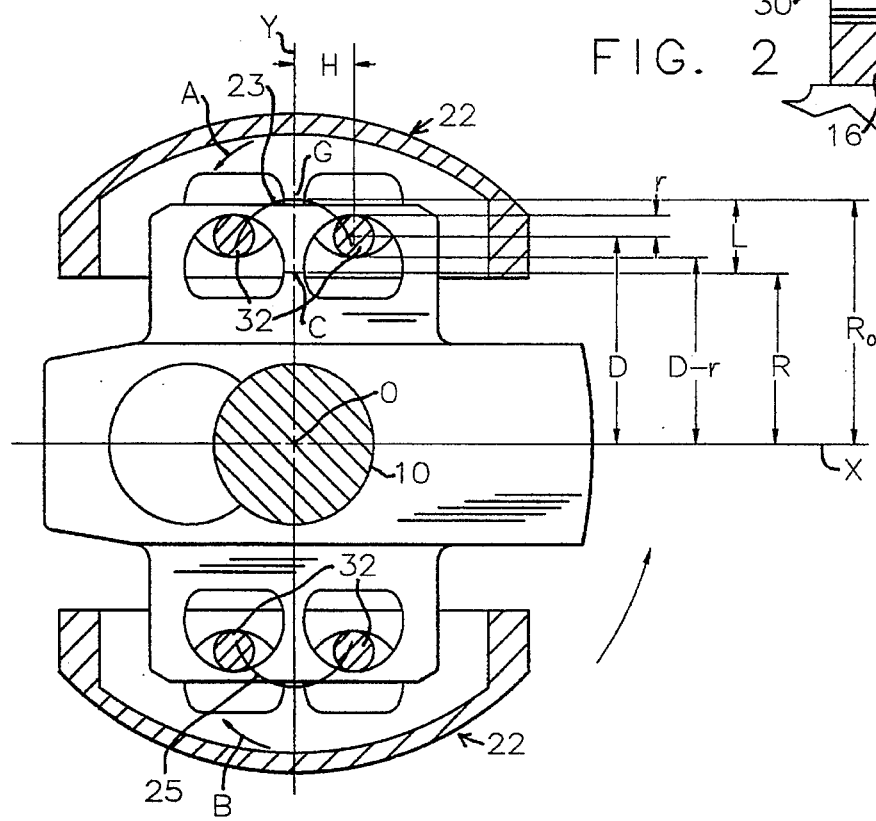
FIG. 3 is a view identical to FIG. 1 wherein significant relationships and movement of the pendulum masses are indicated.

In FIG. 3, coordinates have been added to the structure illustrated in FIG. 1, the horizontal coordinate for the axis of crankshaft rotation being represented at X, while the vertical coordinate through the crankshaft axis of rotation is shown at Y. The center of rotation of the crankshaft is represented by letter O, and the center of gravity of the upper pendulum 22 of FIG. 3 is represented at G, while C represents the center of the movement of the associated pendulum. Because both pendulums 22 are identical, the aforedescribed locations are only indicated relative to the upper pendulum.

In FIG. 3, the distance R represents the radial distance between the crankshaft center of rotation O and the center of pendulum movement C, while the distance L represents the radial distance between the point C and the pendulum center of gravity G.

Below is an explanation of symbols appearing on the drawings, and utilized in the following description:

The X–Y coordinate system is centered at O and rotates with the crankshaft;

O=the crankshaft center of rotation;

C=the center of pendulum movement for small motions;

G=the pendulum center of gravity;

r=radius of rollers 32 (2r=roller diameter);

R=distance from O to C;

L=distance from C to G, and also represents the radius of curvature of the path of G at its vertex;

$R_o = R+L$;

D=perpendicular distance from the X axis to the roller center point;

H=perpendicular distance from the Y axis to the roller center point;

w=tangent angle to the path of G (this variable will be used to parameterize the path);

S=arclength parameter along the path of G;

k=pointwise curvature of the path;

p=pointwise radius of curvature of the path=1/k, where $p^2 = L^2 - z^2 S^2$ is the form used here;

z=path parameter.

For example, traditional tuning has $z_1^2 = N^2/[N^2+1]$ for an epicycloid tuned for order N with a base circle of radius $z_1 R_o$ centered at O, and a generating circle of radius $\frac{1}{2}(1-z_1)R_o$. In contrast, for half-order tuning, $z_2^2 = [(N/2)^2/((N/2)^2+1]$ for an epicycloid tuned for order N/2 with a base circle of radius $z_2 R_o$ centered at O, and a generating circle of radius $\frac{1}{2}(1-z_2)R_o$; this is the preferred case.

With respect to reference information for the variables, w=0 corresponds to the configuration shown in FIGS. 1 and 3, that is, in which G lies at its vertex on the Y axis. Also at this point, S=0 and (X,Y)=(0, (R+L))=(0, $R_o$) is the position of G. In all cases w is taken to vary over the range $-\pi/(2z) < w < \pi/(2z)$.

The following path is followed by the by the c.g. of the upper absorber mass 22 of FIG. 3 at G. For the lower mass 22, the path is simply inverted about the X axis. An example of such a path is shown in FIG. 3, which is mathematically set forth below:

$x_{CG} = L[\sin(w)\cos(zw) - z\cos(w)\sin(zw)]/(1-z^2)$ $y_{CG} = R_o + L[1-\cos(w)\cos(zw) - z\sin(w)\sin(zw)]/(1-z^2)$ The following path is followed by the center of the upper right roller 32 of FIG. 3.

$x_{RC} = H + L[\sin(w)\cos(zw) - z\cos(w)\sin(zw)]/[2(1-z^2)]$ $y_{RC} = D - L[1-\cos(w)\cos(zw) - z\sin(w)\sin(zw)]/[2(1-z^2)]$ The paths for the centers of the other rollers is obtained by straightforward inversions about the X axis and translations.

The preferred curve for the surface 20 of the hole 18 is set forth below. The curves for all of the crankshaft surfaces 20, and the pendulum surfaces 30, are obtained by straightforward translations and inversions of the following relationships.

$x_{co} = x_{RC} + r\sin(w)$ $y_{co} = y_{RC} + r\cos(w)$

The half-order tuning which is achieved by the invention works for identical pairs of absorber masses, and performs best if the paths are taken to be epicycloids tuned to order N/2, that is, $z = (N/2)^2/[(N/2)^2+1]$, for an order N torque. However, other half-order paths will also give out-of-phase absorber motion with good performance. The ratios between the various dimensions to achieve the desired result are critical, in particular, $R/L = (N/2)^2$.

For the case of circular paths, z=0, hole surfaces 20 and 30 are circular of radius $r_1$.

In a dimensional sample of the embodiment of FIG. 3, the radius r of rollers 32 is 0.21", the distance R is 2.0", the distance R+L is 2.89" and the distance D−r equals 2.43".

Equations Governing the System Motion

Following is an explanation of the mathematics which govern the system motion as dampened in accord with the inventive concepts. The effects of friction are not included in these formulas.

The notation and definition of terms are as set forth below:

q=angular orientation of crankshaft;

$S_1$=the displacement of absorber upper mass 22;

$S_2$=the displacement of absorber lower mass 22;

Z'=velocity of Z (Z=S1, S2, or q);

Z"=acceleration of Z (Z=S1, S2 or q);

t=time;

Q=nominal rotational speed of the crankshat, equal to the time average of q';

$J_o$ = sum of the moments of inertia of the rotating crankshaft about point O and of the two absorbers about their respective c.g.'s;

$m_1$ = mass of upper absorber 22;

$m_2$ = mass of lower absorber 22;

$R_1(S_1)$ = radial distance from point O to the c.g. of upper absorber 22, when absorber is at position $S_1$;

$R_2(S_2)$ = radial distance from point O to the c.g. of lower absorber 22, when absorber is at position $S_2$;

$F_1(S_1) = R_1(S_1)\{1-(d[R_1(S_1)]/d[S_1])^2\}^{1/2}$;

$F_2(S_2) = R_2(S_2)\{1-(d[R_2(S_2)]/d[S_2])^2\}^{1/2}$;

$R_o$ = radial distance from point O to absorber c.g. when S=0, that is, at its furthermost position, i.e., at its vertex;

T = applied vibratory torque;

$d[y]/d[x]$ = derivative of y with respect to x, for any function y(x).

The dynamics of this system are governed by Newton's Second Law and can be derived using Lagrange's method. When applied to the present system, it provides the following three differential equations which describe the dynamics of the rotating element and the two absorber masses:

(1) $m_1\{S_1'' + q''F_1(S_1) - \frac{1}{2}q'^2 d[R_1^2(S_1)]/d[S_1]\} = 0$ (2) $m_2\{S_2'' + q''F_2(S_2) - \frac{1}{2}q'^2 d[R_2^2(S_2)]/d[S_2]\} = 0$ (3) $J_o q'' + m_1\{R_1^2(S_1)q'' + S_1 q' d[R_1^2(S_1)]/d[S_1] + F_1(S_1)S_1'' + S_1'^2 d[F_1(S_1)]/d[S_1] + m_2\{R_2^2(S_2)q'' + S_2 q' d[R_2^2(S_2)]/d[S_2] + F_2(S_2)S_2'' + S_2'^2 d[F_2(S_2)]/d[S_2]\} = T$ The first two equations describe the motions of the two absorber masses while the third equation describes the response of the crankshaft to the applied vibratory torque T and the torques supplied by the movement of the absorbers.

The Half-order Absorber Motion

The following is an application of absorbers for counteracting a harmonic torque of order N:

Harmonic torque: $T = -T_N \sin(NQt)$ or $T = -T_N \sin(Nq)$ (Note, the minus sign is not crucial, but provides convenient phasing);

Identical absorber masses: $m_1 = m_2 = m$;

Epicycloidal absorber paths, tuned to order N/2:
$R_1(S_1) = \{R_o^2 - N^2 S_1^2/4\}^{1/2}$,
$R_2(S_2) = \{R_o^2 - N^2 S_2^2/4\}^{1/2}$.

In this case there is a motion of the system in which the applied torque T is completely and exactly counteracted by the torques applied to the crankshaft by the absorbers' movements, resulting in zero torsional vibration. This motion is achieved when the absorbers move in an out-of-phase manner, specifically:

$$S_2 = -S_1 \quad (4)$$

results in a motion of the crankshaft of $$q = Qt \quad (5)$$

implying $q' = Q$ and $q'' = 0$, that is zero torsional vibration. Employing conditions (4) and (5) into equations (1), (2) and (3) results in the following:

$$m\{S'' + SQ^2 N^2/4\} = 0 \text{ for the absorbers; } S = S_1 = -S_2 \quad (6)$$

$$m\{-N^2 Q S_1 S_1'\} = -T_N \sin(NQt) \text{ for the crankshaft.} \quad (7)$$

Due to the epicycloidal path, the relationship between the absorber movements, and the steady rotation, equations (1) and (2) become a simple harmonic oscillator with frequency NQ/2, given by equation (6), and equation (3) simplifies to equation (7) since most of the absorber torque terms cancel out due to the anti-symmetry of the absorber dynamics.

There is an exact solution of equations (6) and (7), of the form:

$$S_1 = -S_2 = A \sin(NQt/2); \text{ (so that } S_1' = -S_2' = \{ANQ/2\} \cos(NQt/2)). \quad (8)$$

The amplitude of the absorbers' motion is then obtained by using solution (8) in equation (7), yielding $$A = \{4T_N/(N^3 Q^2 m)\}^{1/2}. \quad (9)$$

One needs to use the trigonometric identity, $\sin(NQt/2)\cos(NQt/2) = \frac{1}{2}\sin(NQt)$, in order to obtain this result.

The important features of this motion are:

The motion of the absorbers is at frequency NQ/2, while the applied torque has frequency NQ, hence the "half-order absorber pair" designation.

The crankshaft rotates at a constant speed, $q' = Q$.

The absorbers move in an out-of-phase manner relative to one another, so that they oscillate in opposite directions relative to the crankshaft i.e. as shown at A and B in FIG. 3. In other words, while one is moving clockwise relative to the crankshaft, the other is moving counterclockwise, and vice-versa.

All components of the torques generated by the motion of the absorbers cancel except the Coriolis term in the left hand side of the equation (7), and this exactly cancels the applied torque. Note that the torque from the absorbers is nonlinear, as it involves the product term $S_1 S_1'$.

The absorber amplitude is limited to be less than or equal to $$S_{maximum} = 4R_o/(N\{N^2+4\}^{1/2}) \quad (10)$$

at which point the absorber masses reach cusp points in the epicycloidal paths (these occur where $F(S_{maximum})=0$). This limits the torque amplitude to a value, obtained by solving equations (9) and (10) for $T_N$ with $A = S_{maximum}$, yielding.

$$T_{N,maximum} = mR_o^2 Q^2 4N/(N^2+4). \quad (11)$$

Therefore, the absorber motion is valid for large amplitudes, and is restricted only by $A < S_{maximum}$. Equation (11) is very useful for locating and sizing the absorber masses.

Realization of the Absorber C.G. Path

In order to realize the above mathematical solution, it is necessary to design appropriate rollers 32, curves 20 in holes 18 in the crank flanges 16, and curves 30 in holes 28 of the absorber masses 22. There exists a procedure for doing this for general paths, and it can be found, for example in the paper of H. H. Denman (Appendix B, Journal of Sound and Vibration, Volume 159, pages 251–277, 1992). Denman's paper gives the required mathematical formulas for several paths, including circles, cycloids and epicycloids, each tuned to an order of M. In all previous applications, M is chosen to be the order of the torque, designated here as N. For the present half-order tuning, the novel step is taken of selecting paths tuned to order M=N/2 for an order N torque.

The desired tuning can be achieved by proper selection of the size, shape and location of the various holes, and the size of the rollers. The tuning can be done by considering small amplitude movements of the absorber masses, after which the epicycloidal path shape will lock in that tuning for large amplitudes.

The following is standard tuning for small amplitude motion of absorbers in a bifilar arrangement; details can be found in Volume IV, Chapter XXX of the treatise by KerWilson, Practical Solution of Torsional Vibration Problems, Chapman and Hall Ltd, 3rd edition, London, 1968. For small amplitudes (specifically, for S much smaller than $R_o$), the movement of the absorber mass c.g., point G, is very nearly a circle of radius L centered at point C as shown at 23 for the upper mass 22 and at 25 for the lower mass, FIG. 3. Point C is referred to here as the "center of movement". The distance between points C and G is L, as shown in FIG. 3. The distance from point C to point O is labeled as R (again, see FIG. 3). Note that $R+L=R_o$. For tuning to order M, the ratio of R/L is set equal to $M^2$. For the usual tuning, therefore, $(R/L)=N^2$, and for half-order tuning, $(R/L)=(N/2)^2$, which lead to very different geometrical ratios. (For the example shown in FIG. 3, N=3, so that $R/L=(3/2)^2=2.25$ to achieve half-order tuning).

The effective length L can be determined by the radius of curvature, $r_1$, of holes 18 and 28 at their vertex points, and the roller radius, r. For small amplitudes, then, $L=2(r_1-r)$ (see KerWilson's book for the geometrical details).

Note that when circles are used for holes 18, and thus for paths 20, for all amplitudes of pendulum movement the path of G is a circle of radius L centered at point C. In that case, C is the center of curvature for the path of G for all absorber amplitudes. However, for noncircular paths, only for small amplitude motions is the center of curvature located at point C and the radius of curvature of the path of point G equal to L. As the absorber c.g. G moves along its path away from the vertex point, the radius of curvature varies from L and the center of curvature moves away from point C. Since point C represents the center of curvature at small amplitudes, at which point the basic tuning is set, we designate point C as the "center of movement".

Other Embodiments

As indicated above, the inventive concepts may be utilized with a variety of rotating machinery components, including helicopter rotors wherein bifilar pendulum vibration absorbers are commonly used, as indicated in U.S. Pat. No. 4,218,187. A simplified arrangement of apparatus for the utilization of the inventive concepts with a helicopter rotor is shown in FIG. 4.

Figure 4:
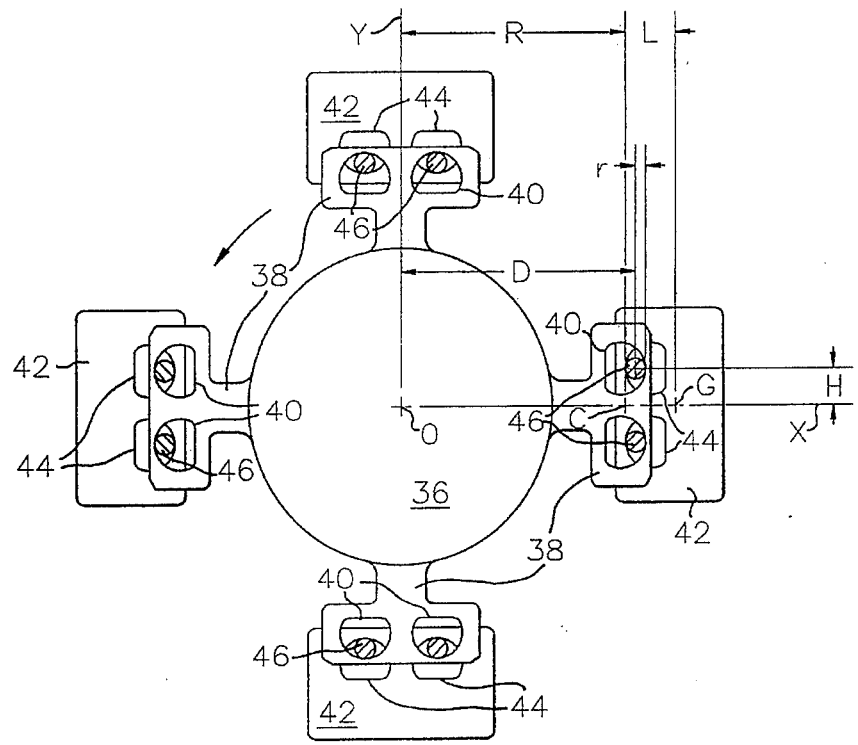
FIG. 4 is a plan view of a basic arrangement utilizing the inventive concepts in a helicopter rotor, the rotors not being illustrated, and significant relationships being identified

In FIG. 4, which is a simplified plan view of a helicopter rotor hub 36, the helicopter blades may be attached to the shaft structure, not shown, supporting the hub 36. Please see U.S. Pat. No. 4,218,187 as illustrating a typical relationship between helicopter blades and a bifilar pendulum vibration absorber mounted upon the blade rotor.

The rotor hub 36 includes four radial extensions 38 located at 90° with respect to adjacent extensions. Each of the extensions 38 includes a pair of holes 40 which may be identical in configuration to the holes 18 formed in the crankshaft embodiment of FIG. 1. A pendulum 42 is mounted upon each extension 38 by means of pendulum holes 44 and rollers 46, and it will be appreciated that the helicopter rotor structure of FIG. 4 will function in a manner to absorb torque vibrations identical to that of the crankshaft embodiment of FIG. 1.

In FIG. 4, the center of rotation of the rotor hub 36 is indicated by letters identical to those employed with reference to FIG. 3, and O represents the center of rotor rotation, C represents the center of movement of the associated pendulum 42, and G represents the center of gravity of the associated pendulum. The distance R indicates the radial distance between the center of rotor rotation and the center of pendulum movement, while the distance L represents the radial spacing between the pendulums center of gravity and center of movement.

In FIG. 4, the significant relationships between the components of the system are identified by identical letters and symbols as used in conjunction with the crankshaft embodiment of FIGS. 1–3. The critical relationships previously described apply to the helicopter rotor embodiment of FIG. 4 and the inventive concepts and theory are identical to that described above.

Figure 5:
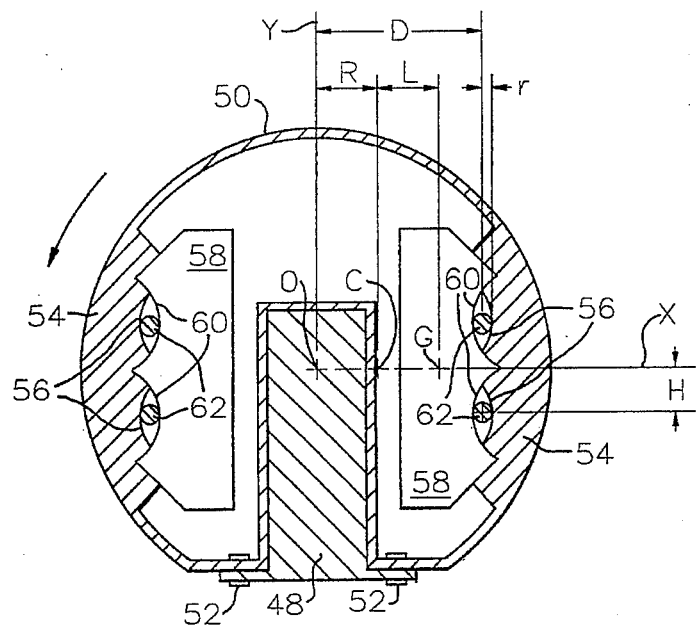
FIG. 5 is a sectional elevational view as taken through an internal combustion engine crankshaft portion utilizing the inventive concepts as employed with internally located pendulum masses and the significant relationships are identified.

FIG. 5 illustrates another embodiment of bifilar pendulum vibration absorber utilizing the concepts of the invention which may be used with an internal combustion engine crankshaft. This embodiment utilizes internal pendulums similar to that shown in U.S. Pat. No. 4,739,679.

In the embodiment of FIG. 5, a portion of the crankshaft is indicated at 48, and may be a portion of a counterweight cheek. A generally circular assembly 50 is mounted upon the crankshaft 48 by fasteners 52, and the assembly 50 includes diametrically opposed roller support portions 54. A pair of concave surfaces 56 are defined upon each roller support 54, and preferably, the configuration of the surfaces 56 is epicycloid, but may be circular or of other acceptable concave configuration.

The pendulums 58 are located radially inward of the roller supports 54, and each of the pendulums 58 includes a pair of concave surfaces 60 disposed in opposed relationship to the surfaces 56. The configuration of the surfaces 60 will be identical to that of the surfaces 56.

Cylindrical rollers 62 are interposed between opposed surfaces 56 and 60, and centrifugal forces acting upon the pendulums 58 will maintain the pendulum surfaces 60 against the rollers 62, and maintain the rollers 62 against the surfaces 56. In this manner, the pendulums 58 will be supported upon the rollers 62 and the surfaces 56 and 60.

The center of crankshaft rotation is indicated at O, and the center of gravity of the pendulums 58 is indicated at G. The center of the path of movement of the pendulums is indicated at point C. The distance R is the radial distance between the center of crankshaft rotation and the center of pendulum movement, while the distance L represents the radial distance between the pendulum center of gravity and center of movement.

As with the helicopter rotor embodiment of FIG. 4, the crankshaft variation illustrated in FIG. 5 utilizes identical half-order vibration absorption, and in FIG. 5, the significant relationships between the components are illustrated by the use of identical letters and symbols employed in the description of the inventive concept as set forth with respect to FIGS. 1–3. The internal placement of the pendulum masses 58 does not affect the concepts and theory of the invention, and with the embodiments of FIG. 5, it is readily possible to achieve those relationships between the components required to achieve the half-order vibration absorption.

It is appreciated that various modifications to the inventive concepts may be apparent to those skilled in the art without departing from the spirit and scope of the invention.

We claim:

1. A method of absorbing torsional oscillations within a member rotating about an axis at Q radians per second wherein the member is subjected to N torque pulses each rotation, using pairs of torsional oscillation absorbing masses movably mounted on the rotating member for angular movement relative to the member axis comprising the step of mounting the absorbing masses for oscillating movement on the rotating member in out-of-phase relation to each other to individually generate oscillating torques of base frequency NQ/2 such that when added together all harmonic components cancel except those of frequency NQ, which add directly to absorb the torsional oscillations of the rotating member.

2. The method of absorbing torsional oscillations within a rotating member as in claim 1 wherein the torsional oscillation absorbing masses are mounted upon the rotating member such that the masses oscillate in out-of-phase relation to each other in opposite directions relative to the rotating element whose vibrations are being absorbed.

3. A method of absorbing torsional oscillations within a member rotating about an axis wherein the member is subjected to N torque pulses each rotation, using a pair of torsional oscillation absorbing masses movably mounted on the rotating member for limited angular movement relative to the member axis comprising the step of mounting the absorbing masses for oscillating movement on the rotating member such that the masses are angularly displaced relative to the member axis to absorb torque oscillations of a frequency of NQ where Q equals the rate of member rotation in radians per second, and wherein the absorber masses move at a frequency of NQ/2.

4. In a bifilar vibration absorber assembly for a member rotating about an axis wherein the absorber system includes one or more pair(s) of separate indentical masses each having a center of gravity and mounted upon the rotating member by support structure permitting the masses to oscillate upon the rotating member in an arcuate path angularly related with respect to the member axis and having a form generated by the configuration of the support structure having a center, the improvement compromising, the radial distance from the member axis of rotation to the masses' arcuate path center, and the radial distance between the center of gravity of a mass and its arcuate path being such that torque oscillations occurring within the member are absorbed by the movement of the masses at one-half the frequency of the applied torque, wherein the masses rotate in opposite rotational directions relative to the rotating member.

5. In a bifilar vibration absorber assembly for a member rotated about an axis wherein Q represents a nominal member rate of rotation and N represents a number of torque pulses per revolution, the absorber including one or more pair(s) of identical separate masses each having a center of gravity and mounted upon the rotating member by support structure permitting the masses to oscillate upon the rotating member in an arcuate path angularly related with respect to the member axis and having a form generated by the configuration of the support structure having a center, the improvement comprising the support structure mounting the masses upon the rotating member such that the mass oscillations are tuned to absorb member torque oscillations with a movement of frequency of NQ/2, wherein the masses rotate in opposite rotational directions relative to the rotating member.

* * * * *